July 6, 1954  R. G. LE TOURNEAU  2,682,717
DOWN PRESSURE BULLDOZER
Filed Feb. 8, 1952  4 Sheets-Sheet 1
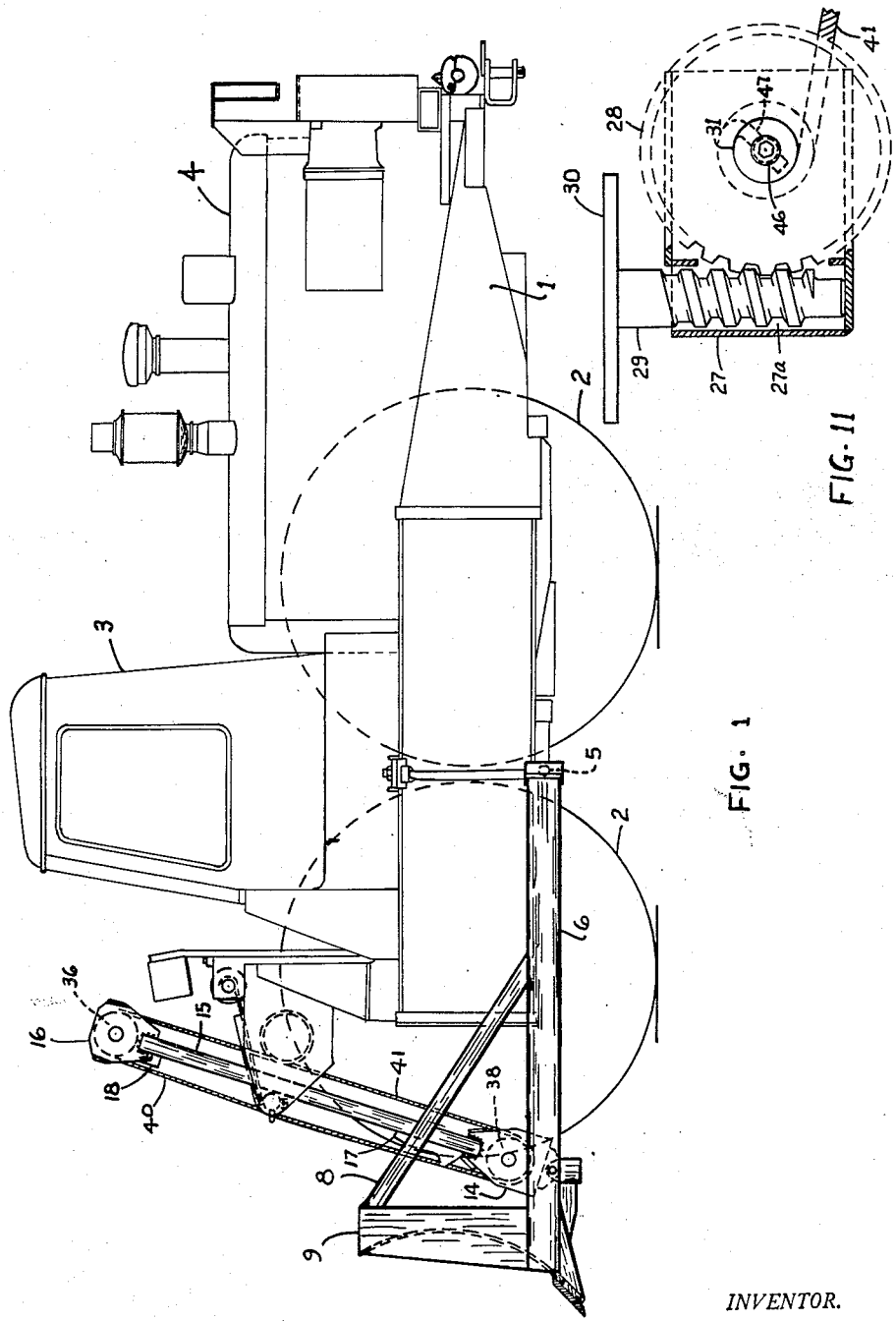
INVENTOR.
ROBERT G. LE TOURNEAU
BY
ATTORNEYS

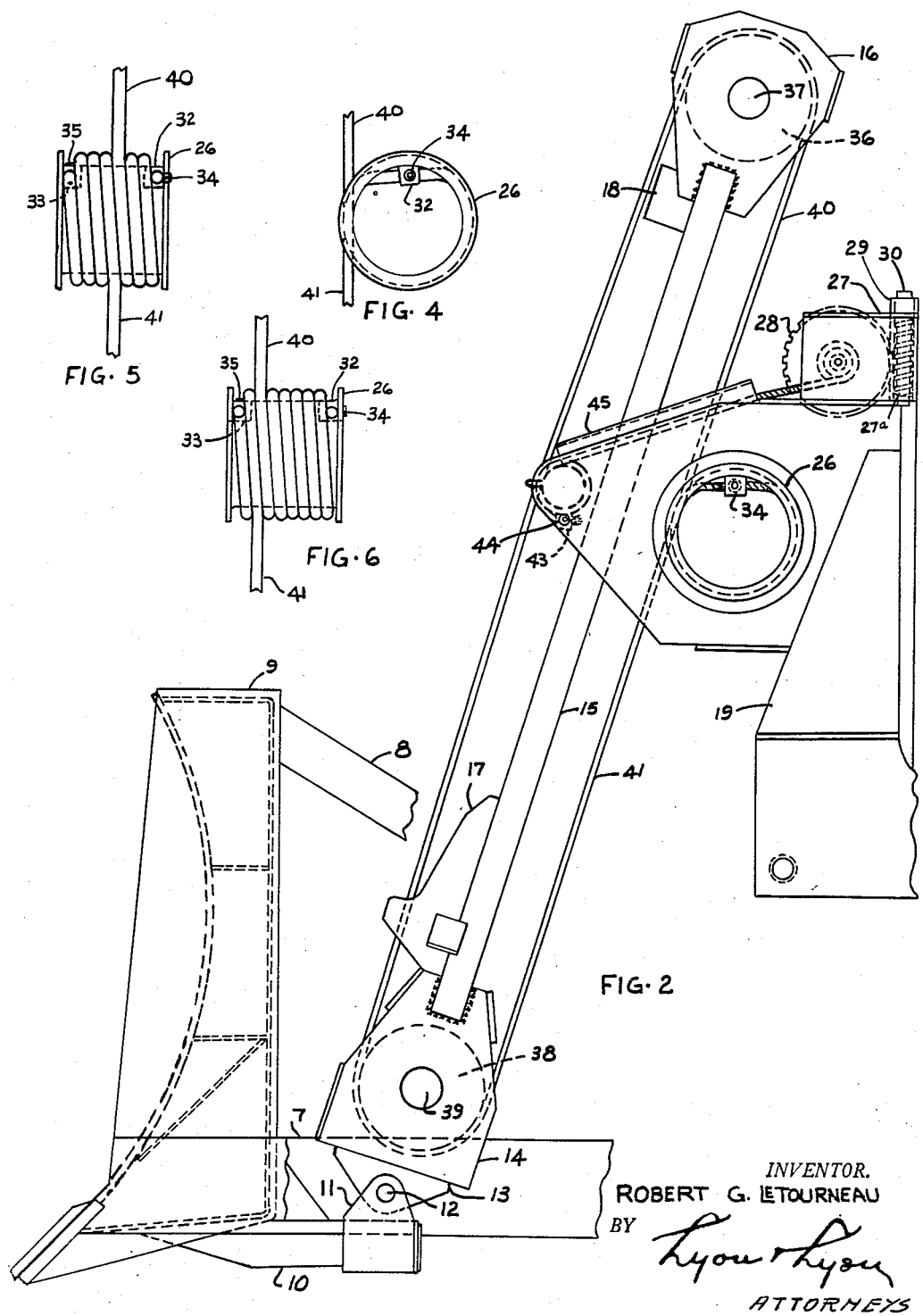

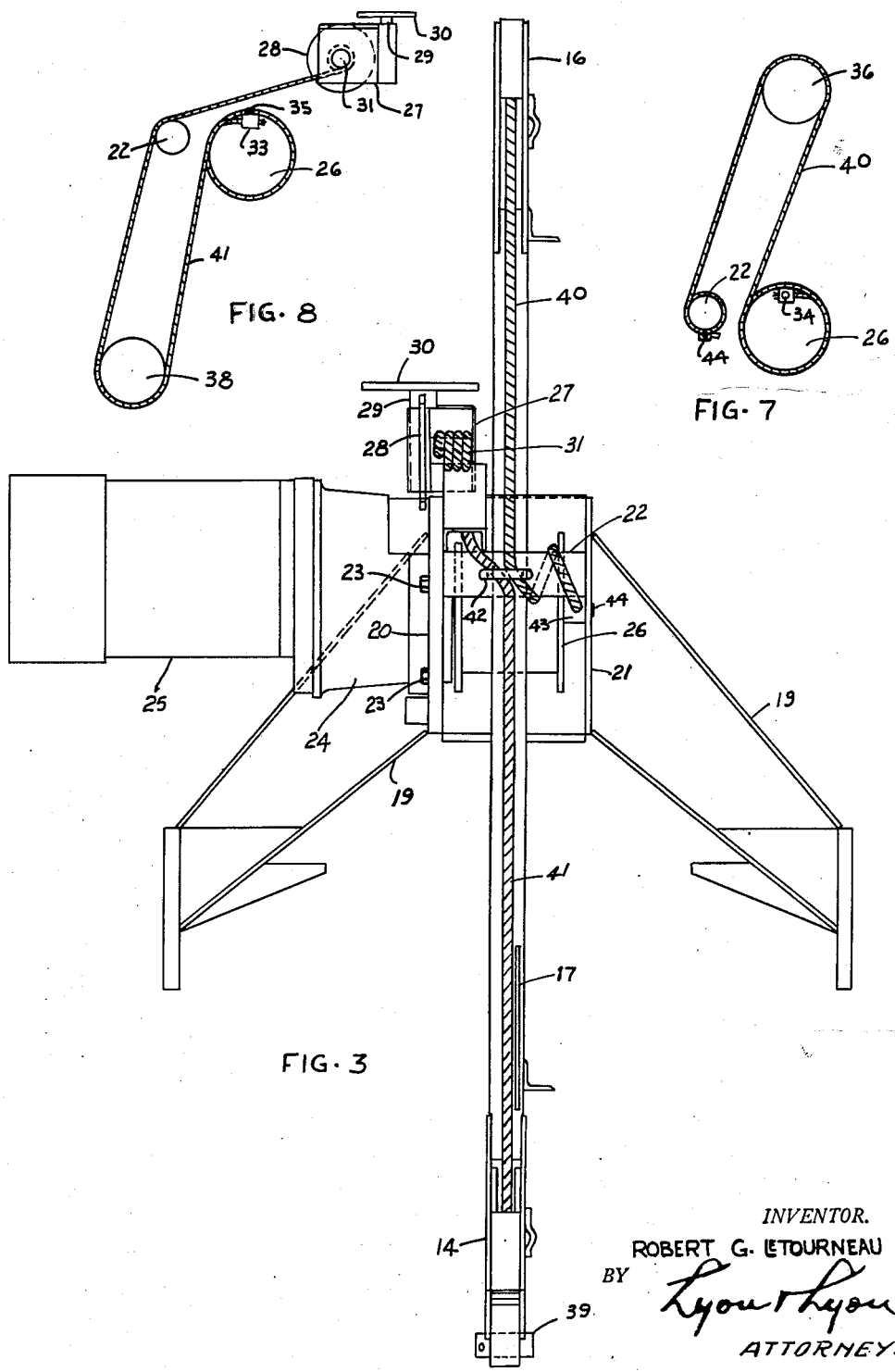

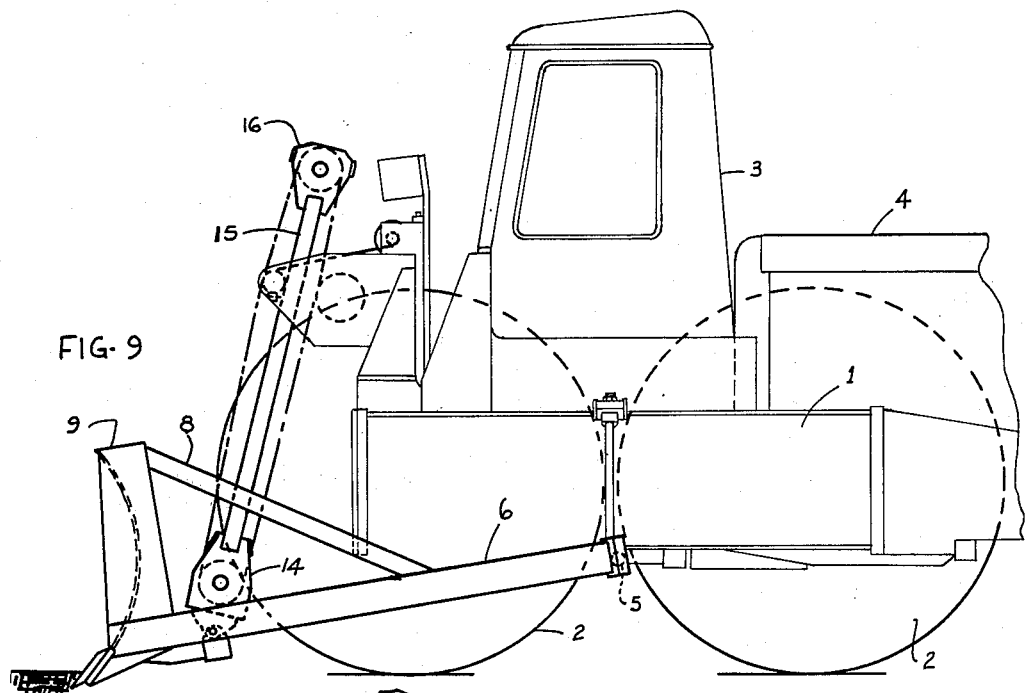
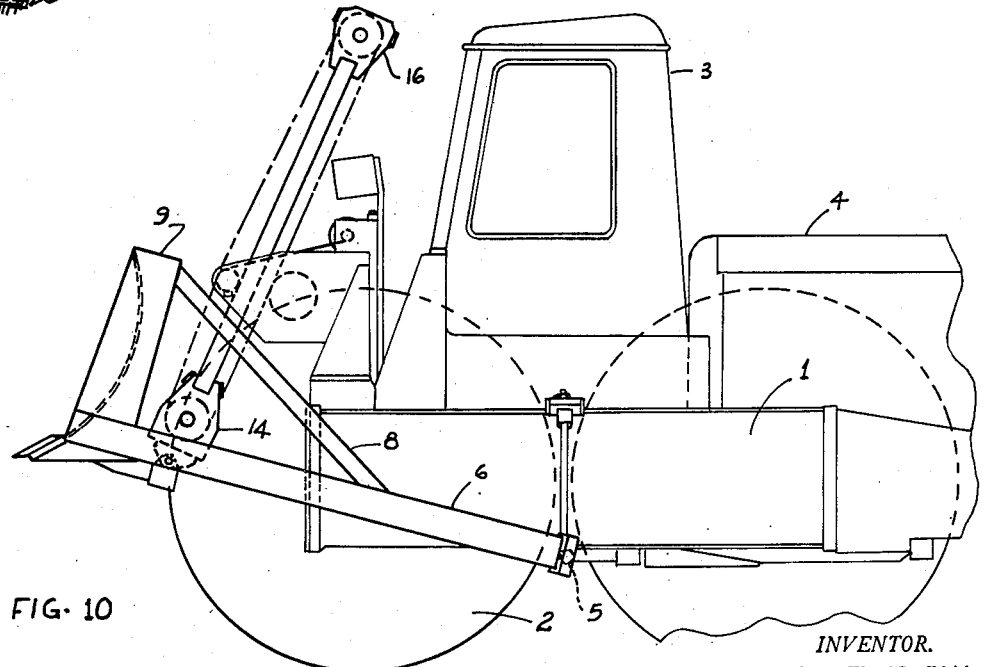

Patented July 6, 1954

2,682,717

UNITED STATES PATENT OFFICE 2,682,717

DOWN PRESSURE BULLDOZER

Robert G. Le Tourneau, Longview, Tex.

Application February 8, 1952, Serial No. 270,596

4 Claims. (Cl. 37—144)

This invention relates generally to material handling apparatus and more particularly to such tractor carried and operated structures as ground leveling machines, root rakes, snowplows and bulldozers, having cable systems for controlling the work blade.

The patents to Brown 2,066,456, Hutchins et al., 2,169,606 and Austin, 2,215,025 show examples of machines in the field to which my invention is directed. This invention relates to improvements in the above mentioned patents as well as in my prior Patent 2,375,801 and my copending application S. N. 97,121, filed June 4, 1949.

One of the biggest problems in the bulldozers of the type referred to is the frequency with which the cables wear out and have to be replaced. This wear is caused largely by cable slacking, kinking and snarling. Where a cable drum is used to wind up the cable and raise the dozer blade, upon lowering of the blade by gravity considerable slack usually is present in the cable. Presence of the slack results in uneven cable winding on the drum and excessive wear.

The primary object of the present invention is to overcome the problems outlined by providing positive down pressure on the blade or bowl of a bulldozer by the use of a winding drum and a constant tension cable winding system.

Another object of my invention is to provide cable tightening means for maintaining the cable substantially taut at all times.

Another object of my invention is to provide a cable system for a bulldozer blade in which the drum size is only half as large and the cable is only half as long as in known cable systems.

Another object is to provide a bulldozer having a down push beam connected to the pusher frame to provide a signal for the operator as to the location of the pusher frame.

Another object is to provide a bulldozer having a down push beam to impart controlled motion to the pusher frame and thereby control its position with respect to the ground.

These and other objects will become apparent upon perusal of the specification and claims.

In the drawings:

Figure 1 is a side elevation of the bulldozer embodying my invention.

Figure 2 is an enlarged fragmentary side view of the down push beam and bulldozer bowl or blade.

Figure 3 is a front view of the push beam and cable winding system shown in Figure 2. For purposes of clarity the cables are not shown on the drum in this view but may be seen in Figures 5 and 6.

Figure 4 is an end view of the winding drum.

Figure 5 is a front view of the drum of Figure 4 showing the cables wound thereon.

Figure 6 is a similar view to that of Figure 5 showing the cables' position on the drum after it has been rotated through several revolutions.

Figure 7 is a schematic drawing showing the upper push beam cable winding.

Figure 8 is a schematic drawing showing the lower push beam cable winding.

Figure 9 is a side elevation of the bulldozer showing the pusher frame subjected to down pressure and engaging the earth.

Figure 10 is a similar view to Figure 9 showing the pusher frame in its raised position.

Figure 11 is a schematic view of the cable tightening mechanism.

Referring more particularly to the drawings, main frame 1 of the bulldozer is mounted on wheels 2 and has bolted thereto a cab 3. Prime mover 4 mounted on the frame provides power for the bulldozer.

Welded to frame 1 are balls 5 for pivotally mounting side arms 6 and 7, one on each side of the bulldozer. Welded to side arms 6 and 7 are struts 8 (only one shown) and bowl 9. Beam 10 is welded to bowl 9 and carries a pair of ears 11 (only one shown). Pivot pin 12 connects ears 11 to bracket 13 which is welded to sheave housing 14. Welded to sheave housing 14 is a push beam 15 which has welded to its upper end sheave housing 16. Near the lower end of push beam 15 is welded positive stop 17 and near the upper end is stop 18.

A-frame structure 19 is welded to main frame 1 and has welded thereto mount plate 20 and bracket 21. Rod 22 is welded between plate 20 and bracket 21. Bolted to mount plate 20 by bolts 23 is gear box 24 driven by reversible motor 25. On the output shaft of gear box 24 is fixed winding drum 26.

Welded on A-frame structure 19 is a cable tightening mechanism consisting of housing 27, worm gear 28, meshing worm 29, handle 30 and shaft 31 turning with the worm gear. It will be noted that housing 27 has a blind hole 27a therein which receives worm 29. This worm is freely floating in hole 27a except for its meshing relation with worm gear 28. Upon rotation of handle 30, slack is taken up in the cable. Thus the taut cable and the relation between worm gear and worm hold the cable tightening mechanism in place and no locking or latching means is required. It will be observed that shaft 31 is a non-reversible shaft having means for rotating it in one direction.

Cable reeving

Tap blocks 32 and 33 are welded at opposite ends of winding drum 26 and have setscrews 34 and 35 threaded therein. At the upper end of the push beam 15 is a sheave 36 rotatably mounted by pin 37 in housing 16. At the lower end of the push beam is a sheave 38 rotatably mounted by pin 39 in housing 14.

The threading of the cable system can best be seen in Figures 2, 3, 7 and 8. A pair of cables 40 and 41 are wound in opposite directions on winding drum 26 (as shown in Figures 5 and 6). Cable 40 is deadened by setscrew 34, is wound for a plurality of turns in a clockwise direction (looking at Figures 2 and 4) around the drum. Cable 40 extends off the drum thence up and around sheave 36, thence through eye 42 and around rod 22 to deadend in block 43 by setscrew 44.

Cable 41 deadends on the opposite end of drum 26 in block 33 by setscrew 35. Cable 41 is wound for a plurality of turns in a counter-clockwise direction (looking at Figures 2 and 4) around the drum. Cable 41 extends off the drum thence down and around sheave 38, thence through eye 42 and cable guide 45. Cable 41 contacts shaft 31 on its bottom side and winds for a plurality of turns to deadend in a hole 47 in shaft 31 and is secured in said hole 47 by setscrew 46.

Cable 41 is wound on shaft 31 in such a direction that pull of cable 41 is counter-clockwise with respect to worm gear 28. Counter-clockwise rotation of worm gear 28 tends to thrust worm 29 against the bottom of blind hole 27a. Slack in cable 41 is taken up by manually revolving worm 29 in a clockwise direction which in turn revolves worm gear 28 winding slack cable onto shaft 31. Cable 41 is maintained taut inasmuch as pull on cable 41 will be absorbed as thrust load against bottom of blind hole 27a. While I have shown the worm 29 as having a blunt end which engages the bottom of bore 27a, it may be made with a tapered end so as to present a smaller surface area for engagement. The surface area can be reduced to needle point size to advantage.

While the push beam of the present embodiment has been shown having only one sheave at each end, it is to be understood that two or more sheaves can be used on the push beam near each end as desired within the scope of my invention.

Operation

The bulldozer and cable system may be seen in various stages of operation in Figures 9 and 10. The position of cables 40 and 41 on the winding drum may be seen in Figures 5 and 6. Energization of the motor 25 will cause rotation of cable drum 26. When the drum is rotated in a counter-clockwise direction (looking at Figures 4, 9 and 10) for several turns, cable 41 will wind off the drum and cable 40 will wind on the drum in the same space vacated by cable 41. Thus it will be seen that the cables will "walk" across the face of the drum and will wind on and off the drum as true as if they were wound in grooves their full depth. It will be noted that drum 26 has a smooth winding surface and does not require grooves. It is to be understood, however, that grooves could be used.

As the drum is rotated in a counter-clockwise direction, downward motion will be imparted to the push beam and the bulldozer bowl will be lowered. One such lowered position is shown in Figure 9, where the bowl 9 may be seen in engagement with the earth.

As the drum is rotated in a clockwise direction, upward motion will be imparted to the push beam, and the bulldozer bowl will be raised. One such raised position is shown in Figure 10.

It will be observed from Figures 9 and 10 that the position of the push beam 15 may be seen at all times from inside of cab 3. Thus an operator inside the cab can use the push beam as a signal, and will know from its position and its movement approximately what the distance is between the bowl and the earth.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A bulldozer comprising a tractor, a pusher frame pivotally mounted on the tractor, a push beam connected to the frame, and constant tension cable and drum means on the tractor for imparting up and down pressure to the frame, said means comprising a power rotated winding drum having a pair of oppositely wound cables thereon, the cables being associated with the push beam for imparting controlled motion thereto, said means further comprising a cable tightening mechanism for maintaining the cable substantially taut at all times, said mechanism comprising a housing mounted on the tractor, a worm gear and shaft journalled in the housing, a worm meshing with the worm gear and a handle for turning the worm, one of said cables deadending on the drum and on the tractor, the other cable deadending on the drum and on said shaft.

2. A device as set forth in claim 1, said housing having a bore formed therein to accommodate the worm, the worm end being in engagement with the bottom of the bore, whereby upon rotation of the worm in the takeup direction the cable is tightened, and any pull by the cable is absorbed as thrust load at the bottom of the bore.

3. A bulldozer comprising a tractor, a pusher frame pivotally mounted on the tractor, a push beam connected to the frame, a winding drum, reversible power means mounted on the tractor for rotating the drum, a first cable having one end fixed on said drum and wound for a plurality of turns in one direction around said drum, a second cable having one end fixed on the drum and wound for a plurality of turns in the opposite direction around said drum, the cables being associated with the push beam, said first cable having its other end fixed on the tractor, and means for maintaining said cables substantially taut at all times so that upon rotation of the drum as one cable winds off, the other cable winds on in the same space vacated by the cable winding off and said pusher frame may be positively forced in a given direction, said means comprising a housing mounted on the tractor, a worm gear and shaft journalled in the housing, a worm meshing with the worm gear and a handle for manually rotating the worm, said second cable having its other end fixed on the shaft and adapted to wind thereon.

4. A bulldozer comprising a tractor, a pusher frame pivotally mounted on the tractor, a push beam connected to the frame, and constant tension cable and drum means on the tractor for imparting up and down pressure to the frame, said means comprising a power rotated winding drum having a pair of oppositely wound cables thereon, the cables being associated with the push beam for imparting controlled motion thereto, said means further comprising a cable tightening mechanism for maintaining the cable substantially taut at all times, said mechanism comprising a housing mounted on the tractor, a non-reversible shaft journalled in the housing and having means for rotating it in one direction, one of said cables deadending on the drum and on the tractor, the other cable deadending on the drum and on said shaft.

References Cited in the file of this patent

UNITED STATES PATENTS

| Number | Name | Date |
|---|---|---|
| 2,037,958 | Baker | Apr. 21, 1936 |
| 2,066,456 | Brown | Jan. 7, 1937 |
| 2,335,851 | Fox et al. | Dec. 7, 1943 |
| 2,375,233 | Magee | May 8, 1945 |
| 2,375,801 | LeTourneau | May 15, 1945 |
| 2,380,625 | Zeilman et al. | July 31, 1945 |
| 2,498,321 | White et al. | Feb. 21, 1950 |